Sept. 17, 1935.      R. L. HINMAN      2,014,842
MILKING MACHINE
Filed July 5, 1932
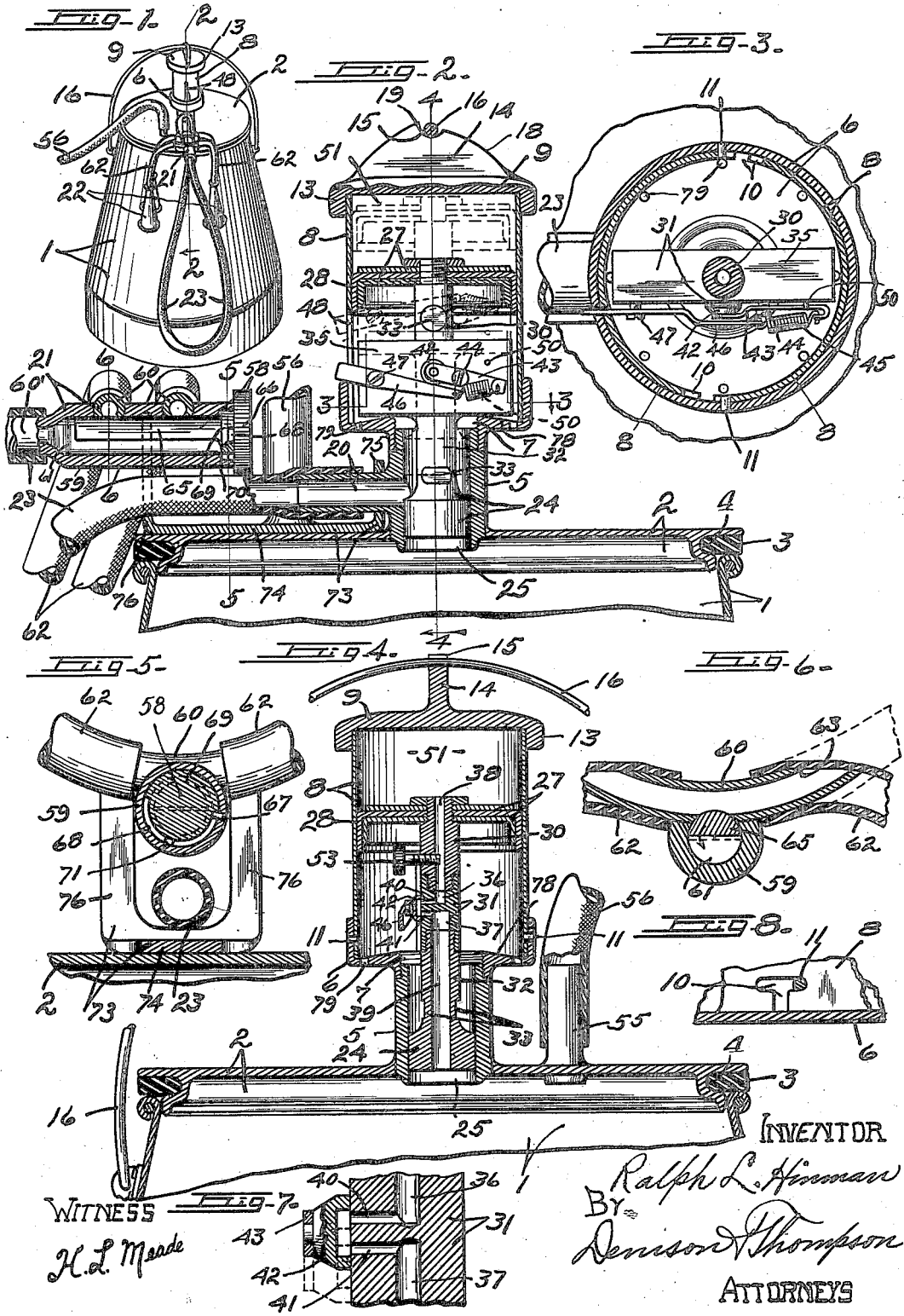
INVENTOR
Ralph L. Hinman
BY
Denison & Thompson
ATTORNEYS
WITNESS
H. L. Meade Patented Sept. 17, 1935

2,014,842

UNITED STATES PATENT OFFICE 2,014,842

MILKING MACHINE

Ralph L. Hinman, Oneida, N. Y., assignor to Hinman Milking Machine Co., Inc., Oneida, N. Y., a corporation of New York Application July 5, 1932, Serial No. 620,885

9 Claims. (Cl. 31—70)

This invention relates to improvements in milking machines in which an intermittent suction and release action is produced in the teat-cups.

The main object of this invention is to provide a milking machine with a durable, simple and economically constructed timer mechanism for automatically causing an intermittent suction and release action in the teat-cups.

Another object is to utilize the vacuum adapted to produce a suction action in the teat-cups for actuating the timer means.

Still another object is to provide a milking machine of the above-mentioned type with a simply operated and constructed valve mechanism associated with the teat-cups for permitting the communication between said cups and suction-producing means to be manually controlled without interfering with the action of the timer mechanism.

A further object is to provide means utilizing a swinging bail for releasably locking the cover to the pail.

A still further object is to provide the pail cover with means for supporting the teat-cups.

Yet another object is to provide a cover for a pail or other receptacle adapted to contain milk with a suction timing device, the parts of which may be readily assembled or disassembled and which may be easily maintained in a clean, sanitary condition.

Other objects and advantages relating to the structure of the device and the form and the relation of the parts thereof, will more readily appear from the following description, taken in connection with the accompanying drawing, in which:

Figure 1 is a perspective view of a milk pail or receptacle having a cover mounted thereon, embodying the various features of this invention.

Figure 2 is a vertical transverse sectional view of the upper end of the pail and timing device taken substantially in the plane of the line 2—2, Figure 1.

Figure 3 is an enlarged horizontal sectional view taken on line 3—3, Figure 2.

Figure 4 is a detail vertical transverse sectional view taken on line 4—4, Figure 2.

Figures 5 and 6 are detail sectional views taken respectively on lines 5—5 and 6—6, Figure 2.

Figure 7 is an enlarged detail sectional view of the valve mechanism for controlling the action of the vacuum in the pail upon the reciprocating pistons.

Figure 8 is a fragmentary sectional view taken on line 8—8, Figure 3.

As illustrated in the drawing, the numeral 1 represents a vacuum pail which is provided with a removable cover 2 which, by virtue of a resilient washer 3 removably secured in an annular recess 4 provided in the cover, is adapted to have an air-tight fit with the pail. The cover 2 is provided with a pulsation-producing mechanism comprising a cylindrical member 5 which has one end extending through an aperture provided in the central portion of the cover 2 and permanently secured thereto by electric welding or other suitable means.

The greater portion of the cylinder 5 extends outwardly from the cover 2 and has the outer end thereof externally threaded for the reception of a cylinder head 6 which is provided with an internally threaded opening 7 located in the central portion of the end thereof and adapted to receive the threaded end of the cylinder 5 for removably securing the head to said cylinder. The outer end portion of the head 6 has an annular recess adapted to receive therein one end of the cylindrical member 8 which has its other end closed by a cap 9 permanently secured thereto in an air-tight manner by any suitable means.

The cylinder 8 is removably secured to the head 6, and for this purpose, is provided with diametrically opposed T-slots 10 adjacent the open end thereof adapted to receive a respective inwardly projecting pin or stud 11 secured to the side wall of the head 6.

It will be obvious by referring to Figures 3 and 8 that when the cylinder 8 is so positioned that the pins 11 will register in one or the other end of the respective slots 10, the cylinder will be secured by the pins to the head 6 and at the same time, the cylinder may be readily removed from the head by rotating the cylinder to an intermediate position with the leg portion of the slots in alignment with the pins.

It may also be noted that with the pins 11 registering in one or the other end of the head portion of the slots 10, that a corresponding turning motion may be produced on the cylinder head 6 through the medium of the cylinder 8 for securing the head 6 to the lower cylinder 5 or for the removal of the head from said cylinder.

In order that the cylinder 8 may be readily manipulated to accomplish these results mentioned above, I have provided the cap 9 with an enlarged annular flange 13 which extends some distance beyond the adjacent side of the cylinder 8 so as to be adapted to be grasped. The cap 9 is also provided with a transverse centrally located wall or rib 14 which extends outwardly some distance from the outer face of the cap. A recess 15 is provided in the outer edge of the rib 14 so as to lie in the axis of the cylinder 8 and adapted to receive the central portion of the usual swinging bail 16 operably associated with the pail 1.

The outer edge of the rib 14 is curved downwardly from one side of the recess 15 to form a cam surface 18 over which the bail 16 may be forced in its movement to and from the recess, while the edge of the rib at the opposite side of the recess is elevated slightly above the recess to form a stop 19 for preventing the bail being carried past the recess. The relation of the recess 15 and the axis of the bail 16 is such that when the bail is swung to its intermediate position over the pail and into engagement with said recess, the cover will be locked to the pail under sufficient pressure to form and maintain an air-tight connection between the pail and cover.

The cylinder member 5 is provided with a laterally disposed nipple 20 which is connected to the claw 21 carrying the teat-cups 22 by means of flexible tubing 23. The nipple 20 is so connected with the cylinder 5 that the opening from the nipple is spaced some distance from either end of the cylinder so as to be opened and closed by a piston valve 24 mounted in the interior chamber 25 of the cylinder 5 as the valve is reciprocated in the chamber for a purpose and in a manner presently described.

In the cylinder 8 is slidably mounted a piston 27 which preferably includes a flexible disk 28 adapted to have an air-tight contact with the wall of the cylinder 8.

The piston 27 is provided with a hollow piston rod 30 which, in this instance, has its outer end fixedly secured by threaded engagement or otherwise to a timer valve 31 positioned in the cylinder 8 between the piston 27 and the head 6. This timer valve also has the piston valve 24 removably connected therewith, and for this purpose, the valve 24 is provided with a hollow stem 32 which has the outer end thereof externally threaded for engagement with an internally threaded recess provided in the lower face of the valve member 31.

The valve stem 32 is provided with opposed flat surfaces 33 adapted to receive a wrench to facilitate securing the piston valve to the timer valve 31 and the removal of said valve therefrom. The timer valve 31 is comprised, in this instance, of a body consisting of a substantially rectangular plate 35 which has the longitudinal edges provided with inwardly extending openings 36 and 37 in communication with the central openings 38 and 39 provided in the piston rod 30 and valve stem 32 respectively. These openings 36 and 37 terminate in spaced relation within the plate 35 and are provided with respective lateral ports 40 and 41 which communicate with the surface of the plate 35 at one side thereof, as shown more clearly in Figure 7.

A concave by-pass valve 42 is associated with the ports 40 and 41 and adapted, when in one position, to bring said ports into communication with each other, as shown by full lines in Figure 7, and when the valve is moved to its other position to cover one of the ports as 41 and uncover the other port as 40, leaving said port open to atmosphere, any suitable means for actuating the valve 42 may be employed and in this instance consists of a valve lever 43 pivotally mounted intermediate its ends upon a shouldered stud or screw 44 secured to the plate 35 at one side of the ports 40 and 41.

The valve 42 is secured to one end of the lever 43, while the opposite end of the lever is yieldingly connected by a spring 45 to the inner end of a trip lever 46 which is pivotally mounted intermediate its ends upon a shouldered screw 47 secured to the plate 35 at the opposite side of the ports 40 and 41 to that at which the pivot 44 is located. The free end of the trip lever 46, in this instance, extends outwardly through an elongated slot 48 provided in the wall of the cylinder 8 and the length of the slot is so related to the movement of travel of the valve assembly consisting of the piston 27, piston valve 24 and timer valve 31 that during the reciprocation of the valve assembly, the inner end of the control lever 46 will be moved from a position at one side of the pivot 44 to a corresponding position at the opposite side thereof due to the free end of the lever 46 engaging the ends of the slot 48 and thereby causing the valve 42 to be quickly moved or snapped from one position, bringing the ports 40 and 41 into communication with each other to the other position where one of said ports will be closed and the other port open to atmosphere.

The movement of the valve lever 43 in either direction is limited for maintaining the valve 42 in one or the other of these positions in proper relation with the ports 40 and 41 by means of a pair of stop pins 50 positioned one at either side of the valve lever 43. The slot 48, in this instance, extends to the outer free end of the cylinder 8 to permit the valve assembly to be readily mounted in the cylinder 8 and, therefore, the outer edge of the side wall of the head 6 is utilized to engage and actuate the trip lever 46 as the valve assembly approaches its lower or innermost position.

It will now be seen that when the valve 42 is in position to bring the ports 40 and 41 into communication with each other, that the chamber as 51 formed between the piston 27 and cap 9 in the cylinder 8, will be connected with the interior of the pail so that any suction produced in the pail will exhaust the air from chamber 51 thereby producing an axial movement of the valve assembly towards the outer end of the cylinder 8.

It will also be observed that when the valve 42 is moved to the other limit of its movement, as illustrated by dotted lines in Figure 7, the chamber 51 will be disconnected with the vacuum in the pail 1 and connected with the atmosphere in the lower portion of the cylinder 8 which will relieve the vacuum in the exhaust chamber 51.

In order that the rate of flow of air drawn from the chamber 51 or admitted to said chamber through the port 40 and passages 36 and 38 may be controlled, as required, I have provided a manually operated control valve 53 which consists of a screw member screw-threaded in the side of the piston rod 30 with the inner end of said screw terminating in the passage 38.

Any suitable means for connecting the pail 1 with an air exhausting device may be utilized and which, in this instance, consists of a nipple 55 secured to the outer face of the cover 2, with the interior thereof extending through said cover and the flexible tubing 56 having one end mounted on the nipple 55 and the other end connected with a convenient vacuum-producing means, not shown.

The nipple 55 is secured to the cover in proximity to and at one side of the nipple 20 secured to the cylinder 24 so that the tubing 23 and the tubing 56 will be maintained at the same side of the cover and thereby permit the free swinging movement of the bail 16 as the cover is secured to and released from the pail in the manner hereinbefore described.

The previously mentioned claw member 21 is of novel construction in that it contains a manually operated valve 58 adapted to bring the teat-cups 22 into and out of communication with the pulsation or suction timer mechanism. This claw member 21 consists of a cylindrical body 59 having one end 60' reduced in diameter to receive the flexible tubing 23. To the upper surface of the body 59 is secured a pair of longitudinally spaced nipples 60 which have the interior thereof in communication with the inner chamber 61 of the body 59. These nipples 60 extend equal distances either side of the body 59 for receiving one end of a flexible tubing 62 which has the other end connected with a respective teat-cup 22. These nipples 60 are, as shown more particularly in Figure 6, arcuate in longitudinal cross section, with the upper portion of each end thereof beveled as at 63 so that when the cups are permitted to hang downwardly from the claw, the openings to the nipples will be closed due to the upper wall of the tubing 62 being drawn across said openings, as illustrated by full lines in Figure 6.

The communication between the teat-cups 22 and the interior of the claw 21 may also be closed by the hereinbefore-mentioned valve 58 which, in this instance, consists of an elongated body portion 65 adapted to extend inwardly from the open end of the claw body 59 beyond the inner positioned nipple 60. This valve body 65 is semi-circular in cross section, with the curved portion thereof of substantially the same radius as the inner chamber 61 of the body 59 so that when the curved portion of the valve is in the upper position or adjacent the nipple 60, the passage from the chamber 61 to the nipples will be closed, and when the valve is in the reverse position, said passage will be opened.

The valve 58 extends outwardly beyond the open end of the body 59 and is provided with an enlarged knurled head 66 which enables the ready operation of the valve. The rotary movement of the valve 58 is limited by a stop pin 67 secured to the body 59 adjacent the open end thereof and which extends inwardly into a semi-circular slot 68 provided in an enlarged annular shoulder 69 formed on the valve body 65 adjacent the head 66. This shouldered portion 69 of the valve is adapted to register in an enlarged annular recess 70 provided in the end of the body 59 and which serves to guide the valve during the rotation thereof.

The recess 68 is positioned at the inner side of the shoulder 69 adjacent the head 66 and in order that the valve may be readily removed from the body 59, the intermediate portion of the slot is provided with a lateral slot 71 which communicates with the inner edge of said shouldered portion.

The slot 68 is of such a length and so related with the curved portion of the valve 58 that when the pin 67 is in registration with one end of said slot, the curved portion of the valve will be maintained in position for closing the entrance from the chamber 61 to the nipples 60, and when the valve is rotated to bring the pin 67 into engagement with the opposite end of the slot 68, said valve will be in the reverse position for maintaining communication between the nipples 60 and the chamber 61.

In order to facilitate handling the teat-cups and prevent them coming in contact with the ground when the cover 2 is being moved from one pail to another in the process of changing pails, or when carrying the pail with the cover thereon from one location to another, I have provided a simply constructed support 73 for the teat-cups which is removably attached to the cover. This support consists of a flat body portion 74 adapted to rest upon the upper surface of the cover 2 and has one end 75 bent at substantially right angles thereto and provided with an aperture adapted to receive the nipple 20 therethrough. The other end of the body 74 is formed to produce a pair of laterally extending spaced prongs 76 adapted to receive the body 59 of the claw member 21 therebetween, as illustrated more clearly in Figures 2 and 5.

It may now be observed that with the tubing 23 removed from the nipple 20, the end 75 of the support 73 may be readily mounted on the nipple, with the body portion 74 thereof resting on the cover 2 and that the support will be maintained in position by the tubing 23 when said tube is mounted on the nipple 20. When the tubing 23 is mounted on the nipple 20, the prongs 76 will extend upwardly at opposite sides of the tube in position to receive the claw 21 therebetween, and when the claw 21 is mounted between the prongs 76 and with said prongs extending upwardly between the nipples 60, the claw will be prevented from accidentally falling from the support, thereby maintaining the cups out of contact with the ground.

It will be observed by referring more particularly to Figures 2 and 4 that I have provided a suction timer mechanism for a milking machine apparatus which is readily assembled and disassembled for cleaning purposes and one which may be readily maintained in a clean, sanitary condition due to the fact that all sharp corners are eliminated, where there is any possibility of these parts coming in contact with the milk, and that the device may operate with a maximum degree of efficiency, and cleanliness, I have provided the interior of the end of the head 6 with an inclined surface 78 tapered inwardly and outwardly from the recess 7 to the outer edge of said head so that oil, dust or other foreign material which may collect upon the interior of the head 6 will gravitate outwardly towards the edge of said head, and that such oil or material may escape from the interior of the head, I have provided the end thereof with a plurality of circumferentially spaced apertures 79 adjacent the outer edge of said inner surface.

The operation of the device is as follows:

When the valve assembly, consisting of the piston valve 24, timer valve 31 and the piston 27, is in its lowermost position, the line of communication between the nipples 20 and the interior of the pail 2 will be closed by the piston valve 24 due to said valve being located beneath the inlet of the nipple 20, within the cylinder 5, and the exhaust chamber 51 in the cylinder 8 will be in communication with the interior of the pail due to the valve 42 being in position to bring the ports 40 and 41 into communication with each other.

It will now be observed that with a vacuum in the pail 1 produced by the tube 56 being connected with a suitable air exhausting device, that the air in the chamber 51 will be drawn downwardly through the passages 38, 36 through the port 40, valve 42 and port 41 and thence out through the passages 37 and 38 into said pail, with the result that the vacuum thus produced in the chamber 51 as it approaches the value of the vacuum in the pail 2, will overcome the action of the vacuum upon the lower end of the piston valve 24, due to the larger area of the piston 27 therey causing the valve assembly to move upwardly into the chamber 51. As the piston valve 24 is thus carried upwardly, the opening to the nipple 20 will first be closed by said valve, after which, as the valve 24 continues its upward movement, said nipple will be brought into communication with the interior of the pail 1 as said opening is uncovered, bringing the teat-cups connected with the nipple 20 under the influence of the vacuum in the pail 1, causing milk to flow from the teat-cups through the tube 23, nipple 20 and lower portion of the chamber 25 of the cylinder 5 into the pail.

As the valve assembly approaches its uppermost position, the valve 42 will be snapped to the lowermost position, due to the trip lever 46 coming in contact with the upper end of the slot 48. This movement of the valve 42 will close the port 41 and open the port 40 to atmosphere, thereby relieving the vacuum in the exhaust chamber 51 and causing said valve assembly to be returned to its lower position due to the action of the vacuum in the pail 1 upon the lower end of the piston valve 24.

As the valve assembly begins its downward movement, the opening from the nipple 20 will first be closed by the piston valve 24 cutting off the action of the vacuum in the pail upon the teat-cups 22. As the piston valve 24 passes the opening, the teat-cups will be brought into communication with the outside atmosphere which is contained in the upper end of the piston chamber 25 and the interior of the cylinder 8.

As the valve assembly approaches its lowermost position, the valve 42 will again be quickly moved to its operative position over the ports 40 and 41 for bringing said ports into communication with each other due to the trip lever 46 coming in contact with the cylinder head 6, thereby bringing the exhaust chamber 51 into communication with the interior of the pail 1 for causing the valve assembly to begin its reverse or outward movement.

These cycles of operation may continue as long as vacuum is produced in the pail 1 to intermittently bring the teat-cups into communication with the vacuum in the interior of the pail 1 or with the outside atmosphere through the medium of the suction timing mechanism.

If, however, it is desired to cut off the communication between the teat-cups and the vacuum in the pail without discontinuing the operation of the timing mechanism, this may readily be accomplished by manually manipulating the valve 58 for closing the openings to the nipples 60 in the manner previously described, and the communication between the teat-cups and the vacuum in the pail may again be established when desired by the reverse movement of the valve 58.

It is now obvious that I have produced a vacuum or pressure operated suction timer mechanism which is simple in construction and operation, which may be readily assembled or disassembled and which may be readily maintained in a clean sanitary condition. Although I have shown and particularly described the preferred embodiment of this invention, I do not wish to be limited to the exact construction shown, as various changes in the form and the relation of the parts thereof may readily be made without departing from the spirit of this invention, as set forth in the appended claims.

I claim:

1. In a milking machine, the combination with a vacuum pail including a removable cover, and means connecting the pail with an air exhaust device, of a valve casing mounted on the cover having piston chambers of unequal cross-sectional area, one of said chambers exhausting through said cover, and having a port adapted to be connected with a set of teat-cups and a reciprocating timer valve member mounted in said chambers consisting of a piston operably mounted in each chamber and tubular means operably connecting said pistons, one of said pistons being adapted to control the communication of the cups with said chamber for alternately bringing the cups into communication with the interior of the pail and with the outside atmosphere, and a valve mechanism carried by the pistons for controlling the passage through said tubular member whereby said pistons will be caused to be reciprocated by the action of the vacuum in the pail.

2. A pressure operated timing mechanism comprising a pair of cylinders of unequal diameters, a piston slidably mounted in each cylinder, fluid-conveying means connecting said pistons in fixed relation, separate conveying means connecting the smaller cylinder with a vacuum-producing mechanism, and a snap valve connected with the first-mentioned conveying means and adapted to engage the wall of one of said cylinders for alternately connecting the larger cylinder with said vacuum and with the atmosphere to effect a reciprocating movement of said pistons.

3. A pressure operated timing mechanism comprising a pair of cylinders of unequal diameters, a piston slidably mounted in each cylinder, fluid-conveying means connecting said pistons in fixed relation, separate conveying means connecting the smaller cylinder with a vacuum-producing mechanism, a snap valve associated with the first-mentioned conveying means and adapted to engage the wall of one of said cylinders for alternately connecting the larger cylinder with said vacuum and with the atmosphere to effect a reciprocating movement of said pistons, and a manually controlled valve associated with the first-mentioned conveying means adapted to control the speed of the pistons.

4. In a milking machine, the combination with a milk-receiving means, of a vacuum-operated hollow timer releasably connected to said milk-receiving means, said timer including reciprocating pistons of unequal cross-sectional area, fluid-conveying means connecting said pistons, a valve mounted on said fluid-conveying means, a valve lever connected with the valve, and a reversing lever yieldingly connected with said valve lever adapted to cause the manipulation of said valve during the operation of the pistons.

5. In a milking machine, a timing mechanism comprising a pair of opposed cylinders of unequal diameters, one of said cylinders being closed at its outer end, and means maintaining the outer end of the other cylinder at substantially constant partial vacuum, a piston slidably mounted in each cylinder, and fluid-conveying means carried by the pistons for alternately connecting said closed cylinder with the vacuum in the other cylinder and with the atmosphere to effect a reciprocatory movement of said pistons.

6. In a milking machine, a receptacle having a vacuum chamber, a timer casing connected with said receptacle provided with a suction opening adapted to be operably connected with a set of teat-cups, and an air inlet opening communicating with the atmosphere, a movable control element operable by difference in pressure upon opposite sides thereof in said casing adapted to alternately bring the suction opening into communication with said chamber and with the atmosphere opening to produce pulsations in the teat-cups, said element being provided with an air passage therethrough in communication with the vacuum chamber, and valve means associated with said passage and controlled by the movement of said member for alternately connecting said casing on one side of said member to said vacuum chamber and to the air inlet opening for effecting the movement of the member.

7. In a milking machine, the combination with a milk-receiving means adapted to be maintained at substantially constant vacuum, of a vacuum operated timer releasably connected to said milk-receiving means comprising a pair of opposed cylinders of unequal diameters, means for continuously subjecting said smaller cylinder to the vacuum within said milk-receiving means, a piston slidably mounted in each cylinder, and fluid-conveying means carried by the pistons for alternately connecting the larger cylinder with the vacuum of the smaller cylinder and with the atmosphere to effect a reciprocatory movement of said pistons.

8. In a milking machine, a timing mechanism comprising a pair of opposed cylinders of unequal diameters, a piston slidably mounted in each cylinder, means connecting the smaller cylinder permanently to a predetermined vacuum, and fluid-conveying means carried by said pistons and rendered effective by the movements thereof for intermittently establishing a vacuum in the larger cylinder and destroying said vacuum.

9. A pressure operated timing mechanism comprising a pair of cylinders of unequal diameters, one of said cylinders being closed at its outer end, means maintaining the outer end of the other cylinder at a partial vacuum, a piston slidably mounted in each cylinder, and means carried by the pistons and actuated by the movement thereof for alternately connecting said closed cylinder with the vacuum in the other cylinder and with the atmosphere to effect a reciprocatory movement of said pistons.

RALPH L. HINMAN.